United States Patent
Simmons et al.

(10) Patent No.: US 9,382,080 B2
(45) Date of Patent: Jul. 5, 2016

(54) SYSTEM, APPARATUS AND METHOD FOR PREPARING MATERIALS TRANSPORTED IN OPEN TOP CONVEYANCE

(71) Applicant: Crown Products & Services, Inc., Carmel, IN (US)

(72) Inventors: Gregg Simmons, Sheridan, WY (US); D. David Hefner, Morgantown, WV (US); Brian Joseph Deah, Allison Park, PA (US); Daniel Raymond Deah, Freedom, PA (US)

(73) Assignee: Crown Products & Services, Inc., Carmel, IN (US)

(*) Notice: Subject to any disclaimer, the term of this patent is extended or adjusted under 35 U.S.C. 154(b) by 251 days.

(21) Appl. No.: 14/149,382

(22) Filed: Jan. 7, 2014

(65) Prior Publication Data
US 2014/0117577 A1    May 1, 2014

Related U.S. Application Data

(63) Continuation of application No. PCT/US2012/029846, filed on Mar. 20, 2012.

(60) Provisional application No. 61/505,993, filed on Jul. 8, 2011.

(51) Int. Cl.
B65G 69/04    (2006.01)

(52) U.S. Cl.
CPC .......... *B65G 69/045* (2013.01); *B65G 69/0425* (2013.01)

(58) Field of Classification Search
None
See application file for complete search history.

(56) References Cited

U.S. PATENT DOCUMENTS

| | | | |
|---|---|---|---|
| 2,717,703 | A | 9/1955 | Kull et al. |
| 3,357,576 | A | 12/1967 | Strombeck et al. |
| 3,774,785 | A | 11/1973 | Gasseling |
| 3,941,047 | A | 3/1976 | Orlando et al. |
| 3,961,752 | A | 6/1976 | Doeksen |
| 4,068,768 | A | 1/1978 | Hicks, Jr. |
| 4,169,170 | A | 9/1979 | Doeksen |
| 4,307,989 | A | 12/1981 | Dumbaugh |

(Continued)

FOREIGN PATENT DOCUMENTS

| | | |
|---|---|---|
| CN | 1511775 | 7/2004 |
| CN | 201362515 | 12/2009 |

(Continued)

OTHER PUBLICATIONS

U.S. Appl. No. 14/018,040, filed Sep. 4, 2013, Nyquist et al.

(Continued)

*Primary Examiner* — Mary F Theisen
(74) *Attorney, Agent, or Firm* — Reinhart Boerner Van Deuren s.c.

(57) ABSTRACT

A system for profiling particulate material in an open top conveyance comprises a profiling structure supported above the open top conveyance and engaging the particulate matter in the open top conveyance as the open top conveyance moves in a forward direction therebelow so that the particulate matter forward of the profiling structure is given a generally uniform profile in at least a longitudinal middle portion of the open top conveyance. The open top conveyance normally is one of a sequential train of gondola cars moving on a pair of rails extending under the profiling structure, and the particulate material typically is or comprises coal.

22 Claims, 15 Drawing Sheets

(56) References Cited

U.S. PATENT DOCUMENTS

| | | |
|---|---|---|
| 4,411,578 A | 10/1983 | Morrow, Jr. |
| 4,625,654 A | 12/1986 | Kuss et al. |
| 4,681,597 A | 7/1987 | Byrne et al. |
| 4,844,683 A | 7/1989 | Compton |
| 5,033,932 A | 7/1991 | Compton |
| 5,140,911 A | 8/1992 | Holland |
| 5,192,337 A | 3/1993 | Wajer et al. |
| 5,193,453 A | 3/1993 | Lundy |
| 5,350,596 A | 9/1994 | Walker, Jr. |
| 5,352,297 A | 10/1994 | Peters |
| 5,441,566 A | 8/1995 | Vaughan |
| 5,488,911 A | 2/1996 | Riggin |
| 5,735,195 A | 4/1998 | Hewitt et al. |
| 5,779,427 A | 7/1998 | Heffinger |
| 6,021,712 A | 2/2000 | Harrop |
| 6,312,206 B1 | 11/2001 | Pylate et al. |
| 6,739,535 B2 | 5/2004 | LaBarbera |
| 6,782,809 B2 | 8/2004 | Bodecker |
| 6,835,041 B1 | 12/2004 | Albert |
| 7,085,625 B2 | 8/2006 | Timothy et al. |
| 7,293,640 B1 | 11/2007 | Aulick |
| 8,549,997 B2 | 10/2013 | Nyquist et al. |
| 2006/0044110 A1 | 3/2006 | Napolitano |
| 2007/0251400 A1 | 11/2007 | Glass et al. |
| 2007/0289861 A1 | 12/2007 | Barkdoll et al. |
| 2008/0236439 A1 | 10/2008 | Low et al. |
| 2008/0298905 A1 | 12/2008 | Lindenbaum |
| 2008/0304065 A1 | 12/2008 | Hesser et al. |
| 2009/0171500 A1 | 7/2009 | Matsumoto et al. |
| 2009/0260539 A1 | 10/2009 | Poncet |
| 2011/0126723 A1* | 6/2011 | Nyquist ................ B65G 67/22 100/43 |

FOREIGN PATENT DOCUMENTS

| | | |
|---|---|---|
| EP | 1864924 | 12/2007 |
| JP | 58-069610 | 4/1983 |
| JP | 58069610 | 4/1983 |
| JP | 8099727 | 4/1996 |
| JP | 8103681 | 4/1996 |
| JP | 10-087046 | 4/1998 |
| JP | 10087046 | 4/1998 |
| JP | 10-258920 | 9/1998 |
| JP | 10258920 | 9/1998 |
| KR | 20060133378 | 12/2006 |
| KR | 200800114584 | 2/2008 |
| KR | 10-2011-0028007 | 3/2011 |
| KR | 20110028007 | 3/2011 |
| SU | 1190069 | 11/1985 |
| WO | WO 2007132072 | 11/2007 |
| WO | WO 2010-077348 | 7/2010 |
| WO | WO 2010077348 | 7/2010 |

OTHER PUBLICATIONS

International Search Report and Written Opinion for International Application No. PCT/US2009/006733 dated Aug. 16, 2010, 6 pages.
International Search Report for International Application No. PCT/US2012/029846 dated Oct. 4, 2012, 3 pages.

* cited by examiner

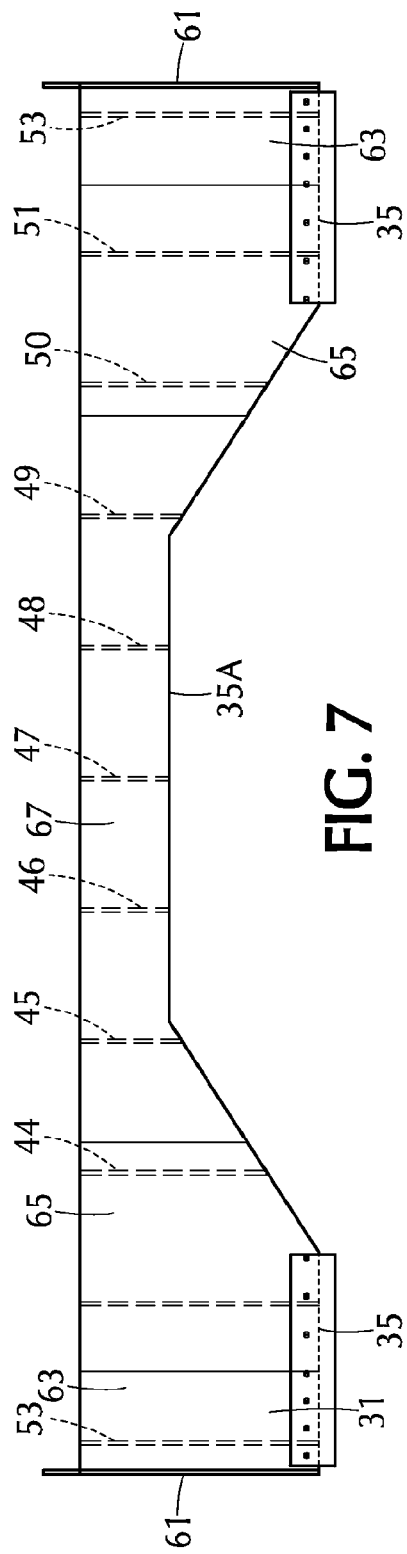
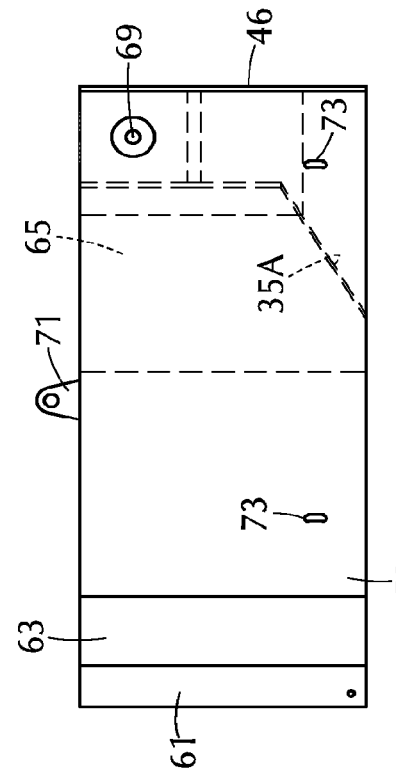
FIG. 7
FIG. 8

SYSTEM, APPARATUS AND METHOD FOR PREPARING MATERIALS TRANSPORTED IN OPEN TOP CONVEYANCE

CROSS-REFERENCE TO RELATED PATENT APPLICATION

This application is a continuation of International Application No. PCT/US2012/029846 titled "System, Apparatus and Method for Preparing Materials Transported in Open Top Conveyance," filed Mar. 20, 2012, which claims the benefit of U.S. Provisional Patent Application No. 61/505,993, filed Jul. 8, 2011. International Application No. PCT/US2012/029846 and U.S. Provisional Patent Application No. 61/505,993 are incorporated herein by reference in their entireties.

FIELD OF THE INVENTION

The present invention relates generally to the field of transport of particulate materials such as coal or gravel. The present invention relates specifically to the processes and methods of transporting particle materials such as coal in open-top gondola railway cars.

BACKGROUND OF THE INVENTION

Some problems in the area of conveyance of particulate materials were identified in International Application No. PCT/US2009/006733, published on Jul. 8, 2010 as International Publication No. WO/2010/077348. That publication is herein incorporated by reference, and the disclosure of that publication is deemed to be combined with the disclosure of the present specification.

Particulate materials such as coal are often transported in open top conveyances, usually railway gondola cars. The material is dumped somewhat indiscriminately into these cars to fill them by hoppers or other large-volume low-accuracy supply mechanisms, with the result that the material is piled somewhat loosely in the gondola car in a humped pile, high in some places, and not present in other void areas in the car.

The humped pile has a number of drawbacks. For one, it positions the particulate material such that air passing over the pile more readily carries away lighter particles and dust, resulting in waste and local deposition of large amounts of undesirable dust etc. Also, some space in the car is wasted by the lack of complete distribution of the material in the interior of the car.

Another problem relates to methods adopted to prevent dust from blowing away from the material in the gondola car. WO/2010/077348 shows a system and a method for compacting materials in an open top conveyance. This compaction is beneficial to prevent fly away of dust or small particulate material. Where the material is loaded in a high humped pile in the railway car, though, it may produce a problem, in that humped pile of material in the gondola car may be so disproportionately located in the car that compaction is difficult, and the amount of material that has to be moved to be compacted may strain the apparatus.

SUMMARY OF THE INVENTION

It is accordingly an object of the present invention to provide a system and method of organizing the contour of the upper surface of particulate material in a gondola car from an original possibly very irregular loaded pile. The shaping of this pile of particulate material is beneficial for aerodynamic purposes and also for subsequent compacting when used in combination with a compacting system such as WO/2010/077348.

According to an aspect of the invention, a system for profiling particulate material in an open top conveyance comprises a profiling structure supported above the open top conveyance and engaging the particulate matter in the open top conveyance as the open top conveyance moves in a forward direction therebelow so that the particulate matter forward of the profiling structure is given a generally uniform profile in at least a longitudinal middle portion of the open top conveyance.

The open top conveyance normally is one of a sequential train of gondola cars moving on a pair of rails extending under the profiling structure, and the particulate material typically is or comprises coal.

According to another aspect of the invention, a method of profiling particulate material in a train is provided. The method comprises providing a profiling structure supported for reciprocal movement in a vertical direction above a pair of rails. The train is moved along on the pair of rails so that the cars pass under said profiling structure. The profiling structure is elevated to a height adequate to provide clearance for a forward end wall of one of the cars to pass thereunder. The profiling structure is lowered so as to engage the particulate material in the car rearward of the forward end wall, and the particulate material in the car is profiled. The profiling structure is elevated to a height sufficient to provide clearance for a rear end wall of the car.

According to an aspect of the invention, a compaction system is also provided supported above the rails and forward of the profiling structure, and, after profiling, the particulate material in the car is compacted with vibration and downward force applied thereto.

According to an embodiment herein, the profiling structure includes a plow structure comprising a rearwardly concave plow wall with a plurality of vertical wail facets angulated with respect to each other, and a reinforcement structure affixed to a rearward surface of the plow wall. The plow wall has a downwardly disposed recess therein that defines a profile shape imparted to the particulate material. That profile shape has a horizontal center surface and lateral obliquely downwardly extending side surfaces. A cross beam supports the plow structure, and it is movingly supported on and extends laterally rearward of a pair of pillars each positioned laterally outward of a respective side of the rails.

Preferably, the method is controlled by a computer system that administers the vertical positioning of the profiling structure and senses the approach of the individual railway cars of a train being profiled.

The nature of the sculpting or correction of the contour of particulate matter is accomplished using a profiling structure that is movably supported so as to be elevated or lowered onto the top of a gondola car. The profiling structure includes a part analogous to a plow that moves material in the car as the car rolls under the profiling structure when it is lowered thereon, with the result that the particulate material in the car is given a profile that is more aerodynamic and sheltered from the passing air than the original humped pile, and, when used with a compacting system, provides the material positioned for optimal compaction.

The profiling plow structure is supported for reciprocating vertical movement controlled by railway car sensors and a computer system that controls its deployment, elevating the plow structure to clear the walls of the railroad car or other obstructions, or other locomotive or railway car dimensions.

Other objects and advantages of the invention will become apparent from the present description.

BRIEF DESCRIPTION OF THE DRAWINGS

FIG. 7 is a front view of the plow structure of FIG. 5.

FIG. 8 is a right side view of the plow structure of FIG. 5.

DETAILED DESCRIPTION

Figure 1:
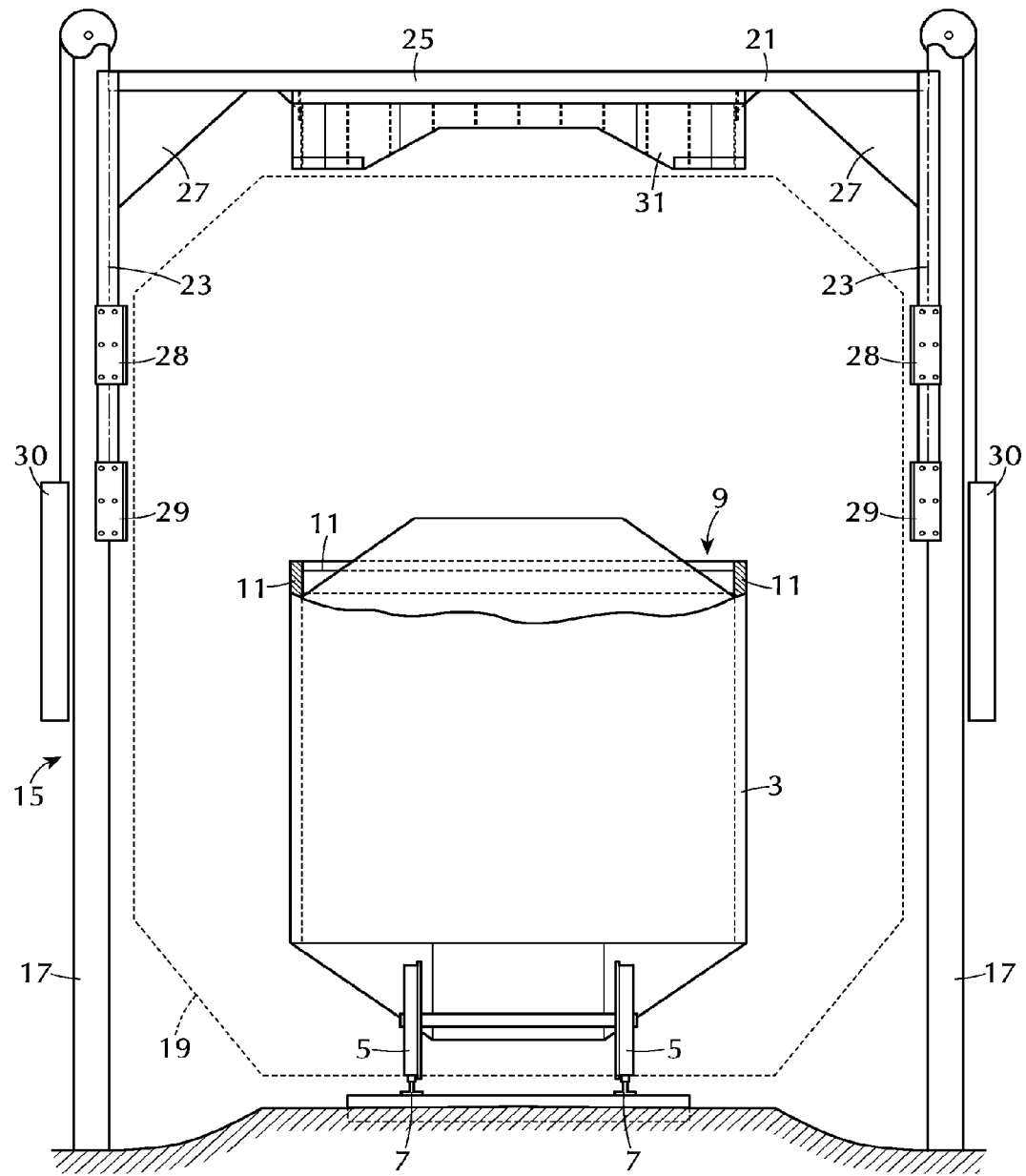
FIG. 1 is an elevational view of a profiling structure according to the invention over a railroad car.

Referring to FIG. 1, a forward looking view is shown of a railway car 3 that is supported on wheels 5 that roll accordingly to the common railway technology along a pair of rails 7. The railway car is a gondola car, meaning that it has an open top generally indicated at 9 into which particulate matter, particularly coal, is loaded. The gondola car has an upper rail at 11 on each side of the car 3 and at each end of the car as well, defining a rectangular open top into which the coal or other material is loaded.

The railway car 3 is loaded with particulate matter in the usual hopper or other loading methods, and then passes through the profiling apparatus generally indicated at 15. The apparatus 15 comprises a pair of laterally spaced I-beam pillars 17 on either side of the rails 7 fixed in the ground. The pillars 17 are spaced wide enough to allow the maximum permissible size contour 19 of a railway train to pass between them without contact.

Supported on the pillars is an inverted U-shaped frame 21, which comprises a pair of laterally-spaced vertical members 23 and a cross member 25. Corner gusset structures 27 are connected between the side beams and cross beams to reinforce the structure. The side members 23 are supported for sliding reciprocating vertical movement up and down on the pillars 17 by a pair of bearing structures 28 and 29 on each member 23.

Cross member 25 is welded to and moves with the side members 23. Cross member 25 supports extending downwardly therefrom a profiling structure having a plow structure 31. The frame 21 and the supported plow structure 31 are moved up and down sliding with bearings 28 and 29 along pillars 17.

The entire frame 21 is supported by a counterweight pulley system 30 of cables and pulleys attached thereto that draw the frame 21 upward so that the default position of the plow 31 is elevated as seen in FIG. 1, with plow structure 31 above the top of the permissible railroad train outer silhouette 19, so that no contact is possible between the locomotive, other cars or any other part of the railroad train and the plow structure 31 when it is so elevated. The counterweight and pulley structure 30 lifts the plow 31 to this point unless it is drawn downward by a controlled countervailing cable or pulley system (not shown), or by hydraulics that lift the counterweights or draw down on the frame 21, so that the plow structure 31 meets the top of the railway car 3. The control of this vertical movement of the frame and plow structure 31 is preferably by a computer system that receives data signals produced by electric eyes or other sensing devices that can determine the height and presence of railway cars, or can identify the cars and their dimensions by accessing data indexed by identification data carried on the railcar itself, as by an RFID tag, to ensure that clearance is always provided as the railway cars 3 pass through the overall apparatus 15, and so that the computer system can determine when to lower the profiling apparatus to groom the material in the car 3.

Figure 2:
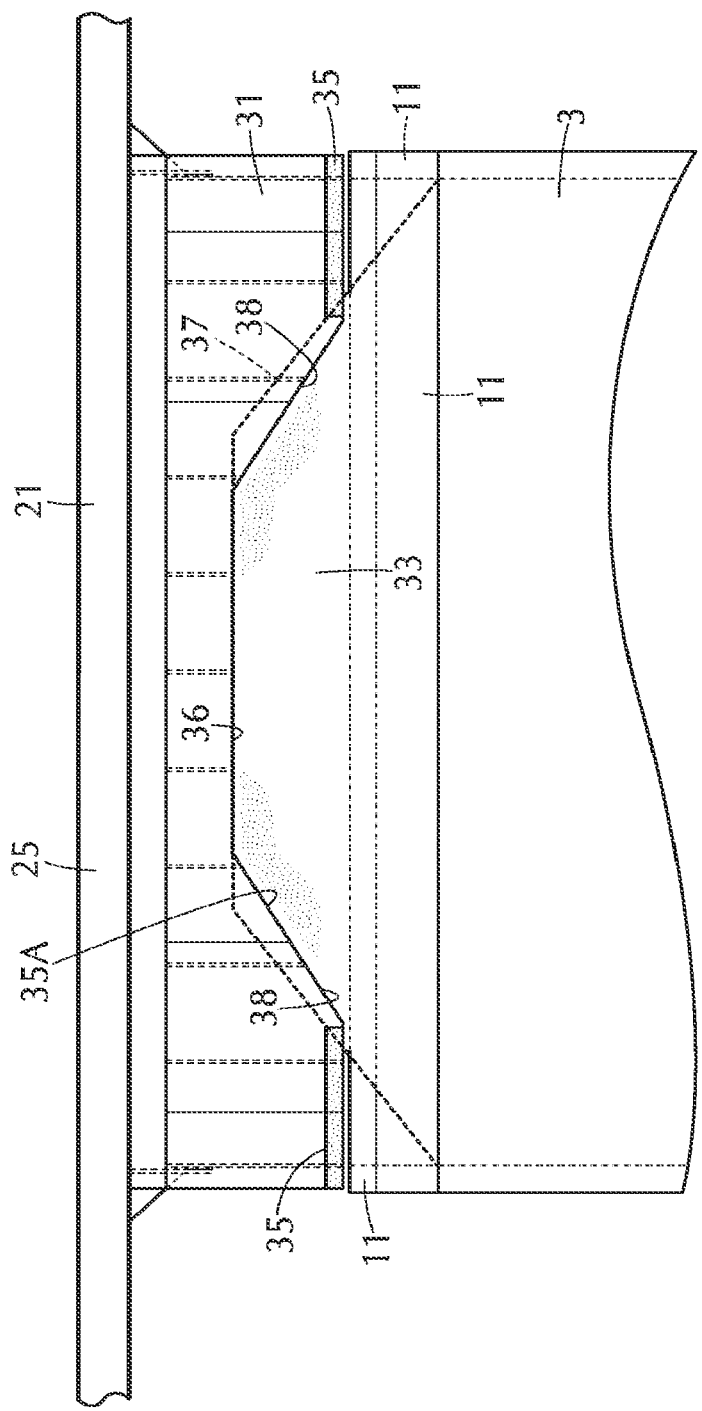
FIG. 2 is a detailed elevational view of the interaction of the profiling structure of FIG. 1 with the material in the railway car when lowered onto the upper surface of the railroad car.

When lowered to the surface of the railway car 3, the plow structure 31 moves to the position shown in FIG. 2. When lowered to this position, the plow structure 31 engages the top of the accumulated particulate material or coal 33 and also reaches the top of the side rails 11 of the car 3. When in this position, the plow provides for profiling by the shape of the lower edge of the plow which has a pair of rubber, or other durable elastomeric material, contact aprons 35 on each side of the plow structure 31, extending generally horizontally, that engage top rail 11 and aid in preventing material from falling out of the gondola car while profiling is taking place. The plow structure 31 has a center peak inset 35A, which has a roughly trapezoidal shape with a horizontal upper edge 36 and downwardly sloping edges 38, which are at an angle of about 26 degrees from horizontal. The plow structure 31 is stationary while the car 3 moves forward, pressing the material 33 in the car 3 against the plow structure 31. The material may be in an irregular original hump distribution shown by phantom line 37, but as it reaches the plow structure, it can only pass it by clearing under the inset 35A, and the material 33 is pushed rearward in the car until it can settle into a location in the car 3 where it is within the inset profile 35A. As a result, the plow structure 31 profiles the material 33 to reduce it from the humped outline 37 to a profile that matches the inside contour 35A of the plow structure 31.

This is accomplished by lowering the plow to the position of FIG. 2 while the car 3 is moving. The plow structure is essentially a passive structure, and the material in the car is moved by the movement of the car, resulting in the material 33 being profiled as described.

Figure 3:
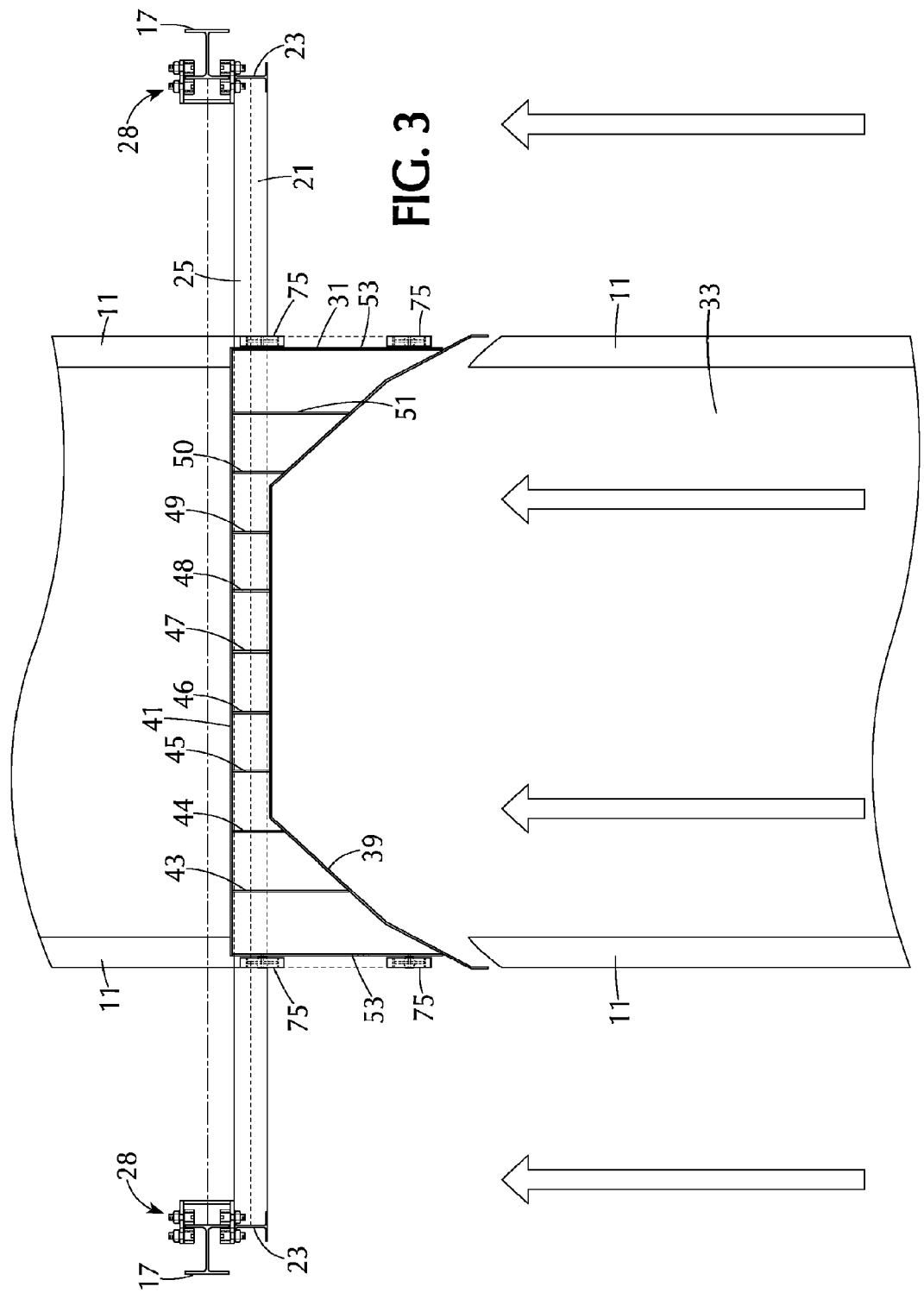
FIG. 3 is a plan view of the profiling structure of FIG. 1.

Referring to FIG. 3, the plow structure 31 is supported under cross beam 25 (which is transparent in FIG. 3 so as to clearly show the parts of the plow structure 31). The plow structure 31 comprises a front plow face member 39 with a number of angulated facets. In addition, the plow structure 31 has a rear wall plate 41, and welded to and extending between the rear wall plate 41 and the plow face 39 are a plurality of support walls 43, 44, 45, 46, 47, 48, 49, 50 and 51, all extending lengthwise relative to the railroad car movement in vertical parallel orientation. The farthest outward portion of the plow face 39 and the rear wall 41 are connected by side walls 53 at each lateral end of the plow structure. The walls are all welded together to form a unitary structure with a series of boxlike compartment reinforcement structures.

Figure 4:
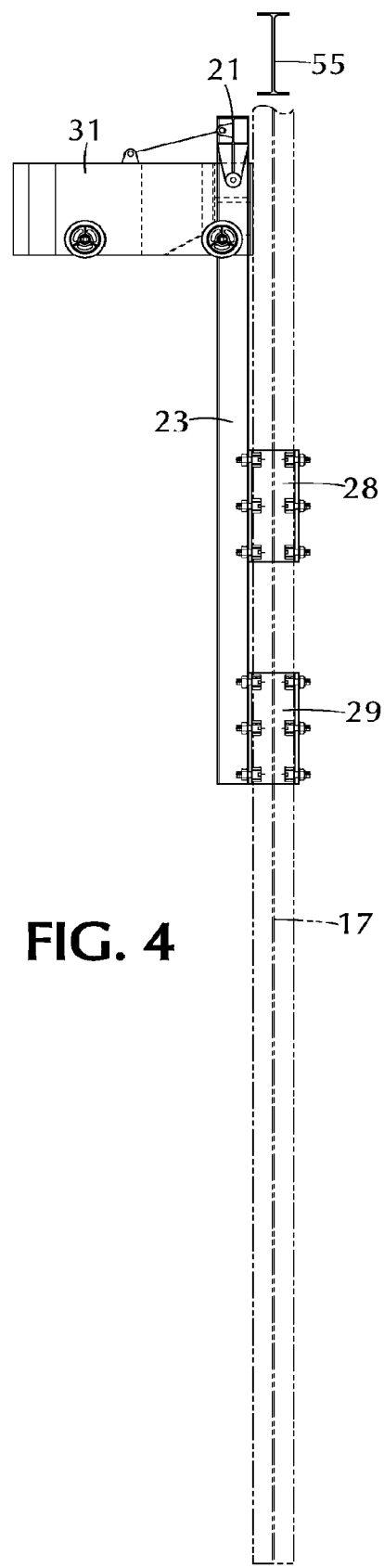
FIG. 4 is a side view of the profiling structure.

Referring to FIG. 4, the plow structure 31 is supported on frame side members 23 which are bolted to a pair of upper and lower bearing channels 28 and 29, which slide up and down along pillar 17, shown in phantom. The bearings 28 and 29 are configured to slide up and down on the laterally inward flange, i.e. the bottom flange of the I-beam of pillar 17, as will be shown further herein. The pillar 17 extends upward to preferably an I-beam cross structure welded to it above the operating area of the overall frame 21 and plow structure 31, and the upper ends of the pillars are rigidly spaced apart and supported by cross beam 55.

Figure 5:
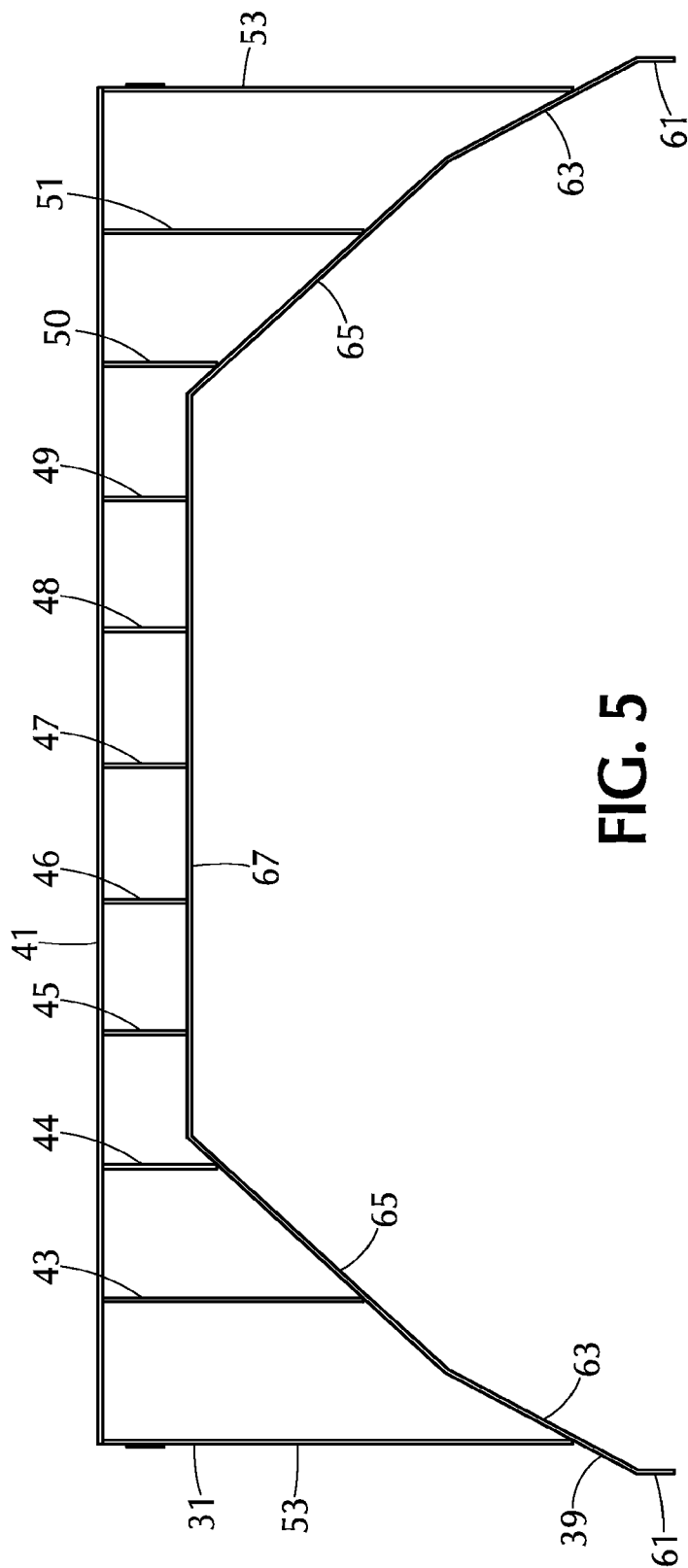
FIG. 5 is a plan view of the plow structure of the profiling structure of FIG. 1.

Referring to FIG. 5, the rear wall 41 is weld-connected to forwardly extending walls 43-51 and side walls 53 to support any loads applied to the plow face member 39. This member 39 is of one single piece but it is bent so that it has facets angulated with respect to the direction of transit of the car. At the forward end, a fairly short, approximately 3-inch long wall portion or facet 61, extends in the forward direction. Rearward of front wall portion 61 is angulated wall portion or facet 63 angulated at an angle a of thirty degrees relative to the longitudinal direction of the device. This is connected with a further rearward facet or angle wall portion 65 angulated at approximately forty-five degrees to the longitudinal direction, and then the angled wall portions 65 are connected to the transverse rear wall portion of the plow face 39 indicated at 67, which wall extends at ninety degrees to the direction of travel, i.e. transverse to the longitudinal direction of travel of the railroad cars.

The facets 61, 63, 65 and 67 are at differing angles relative to the direction of movement of the railroad car when the plow is in place, but they are all vertical when the profiling structure is in use. The facets are all also planar. As a consequence, the facets are dissimilar to a plow in which the blade is tilted upward for scooping up material. The plow structure 31 of the present invention is intended to profile and shape the material in the car, not to lift it.

Additional reinforcement of the plow structure is possible by welding a top plate gusset to the top edges of wall portions 65 and 67, and possibly 61 and 63, so as to bear loads that tend to widen the curvature of the plow structure.

The angulation of these facets creates a sort of capturing or gathering structure that, as the railroad car moves under the plow structure, causes the loose material 33 to be pushed inward laterally of the car, so that as the car rolls under the plow structure 31, the material is pushed rearward in the car or allowed to pass underneath the plow to obtain the profile of the upward recess 37 in plow structure 31. The excess material does not generally fall off the sides of the car, as the structures 63 and 61 of the plow face 39 are configured to be at approximately the lateral side limit of the rails 11 of the standard width or a gondola car. Material 33 that does not pass through the profile 35A is pushed back along the car 3, to the rear end of the car where there is usually excess space, and any loose material can fall and pass underneath the plow structure. The plow structure is preferably automatically raised when the car end wall passes below it, as detected by the computerized control system. The aprons 35 lift off the rails 11 until the car leaves, and then the advent of the next railway car is detected by the computerized control system, preferably by a sighting device, and then the structure 31 is lowered again so that the aprons 35 touch the side rails 11 of the next car.

Figure 6:
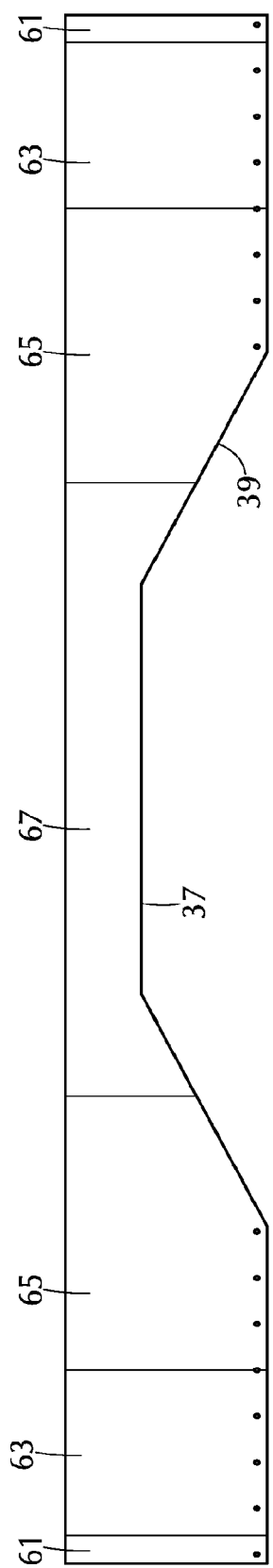
FIG. 6 is a view of the front particulate material engagement plate of the plow structure in a flattened form before being bent into shape for fabrication into the plow structure.

As best seen in FIG. 6, the structure of the plow front face 39 is preferably a single piece of material which is bent into the operational shape of the front face 39. The lower edge of this structure that creates the recess 35A is predetermined to create the desired profile shape of the particulate material 33 and the gondola 3. The lower edge of the plow face member 39 is provided with a plurality of apertures in facets 61, 63 and 65 by which the aprons 35 may be bolted to its lower edge.

Referring to FIG. 7, a front elevational view of the plow structure is shown. The positions of the relative facets 61 through 67 of the forward plate face 39 are shown. Also, as may be seen, the various walls 43 to 51 and side walls 53 all extend vertically from the top edge of the plow face plate 39 to its lower edge, either adjacent the aprons 35 or in the profile indentation area 35A.

Referring to FIG. 8, the side wall is provided with a number of connector structures to support the plow structure 31. Specifically, the side wall is provided with an aperture indicated at 69 and a lug 71. Both provide for an opening for attachment to the cross beam 25. The side wall is also provided with a rolling engagement system by it having a pair of wheel mounting openings 73 to which are connected a pair of wheels 75 on each side of the plow structure 31. These wheels 75 have rubber tires and they roll along the top rail 11 of the gondola car 3 as the car moves under the plow structure 31, supporting the plow structure rollingly on the side rails 11, and preventing any metal-to-metal contact between the plow structure and the railway car.

Figure 9:
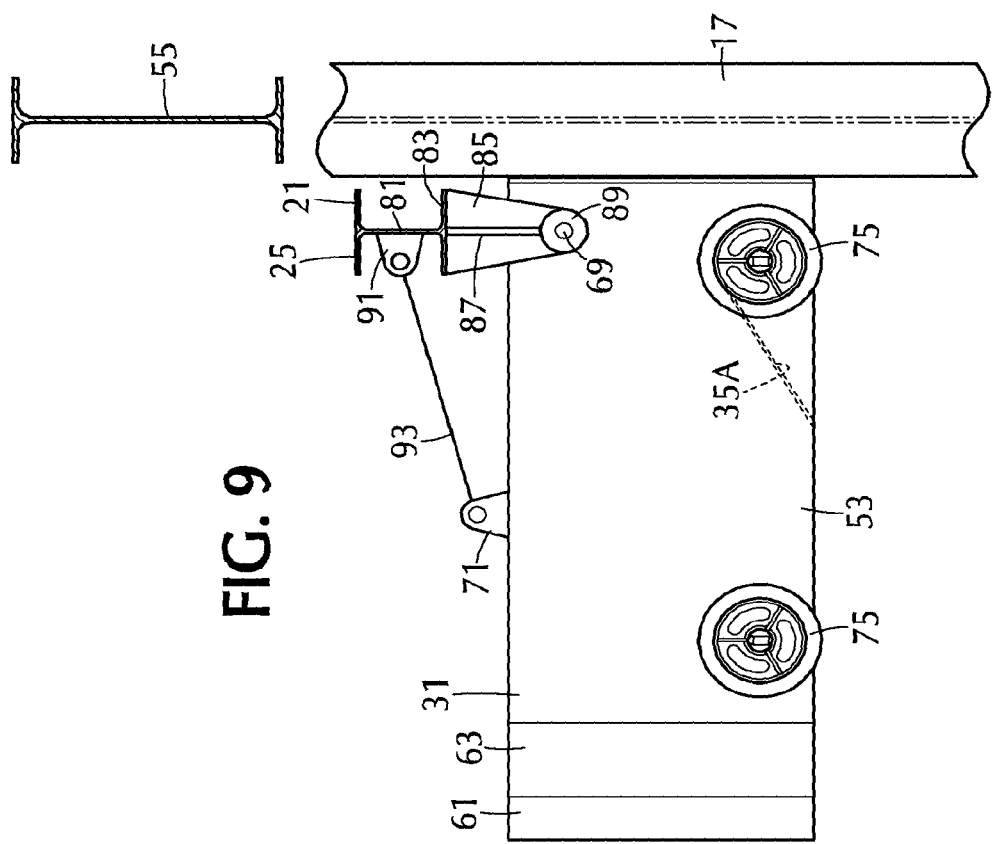
FIG. 9 is a partially cut away view of the right side of the profiling structure adjacent a supporting pillar, which is a mirror image of the left side view.

Referring to FIG. 9, the connection of the plow support 31 to the cross beam 25 of frame 21 is shown supported as it is adjacent the side pillars 17 which extends up to a top cross member 55, the plow structure 31 here being shown in the completely raised position.

The cross member 25 is an I-beam having a top flange, a vertical web 81 and a lower flange 83 extending generally horizontally. To the under surface of the lower flange 83 a downwardly extending generally triangular lug 85 extends reinforced by a gusset 87 which is of triangular shape between the lower flange and the lug 85. The lower end of the lug 85 has an opening through which a bolt 89 is inserted. The bolt extends also through aperture 69 in the side wall 53, and there is an equivalent identical mirror image lug 85 on the opposite side bolted to an identical aperture 69 in the opposing plate 53, which is a mirror image of the side wall 53 shown in FIG. 9. The plow structure 31 is therefore supported for pivotal movement at this point. Preserving the plow structure 31 in the horizontal position shown is a lug 91 attached to the web 83 of the cross member 25. This lug 91 is connected by a cable or a rod connection 93 to lug 71 at the top end of the side wall 53, with these two parts aligned longitudinally, so that the plow structure 31 is held in the position shown.

As can be seen in FIG. 9 also, the wheels 75 are supported for freewheeling rotation on respective bolts to side wall 53 and can roll along the upper surface of the side rails 11 of the railway car 3. The wheels extend just slightly below the bottom edge of the plow structure so that there is less likelihood of direct metal to metal contact in the system. To the extent that the plow structure rests its weight on the side rails 11, the wheels 75 can support the weight applied.

Figure 10:
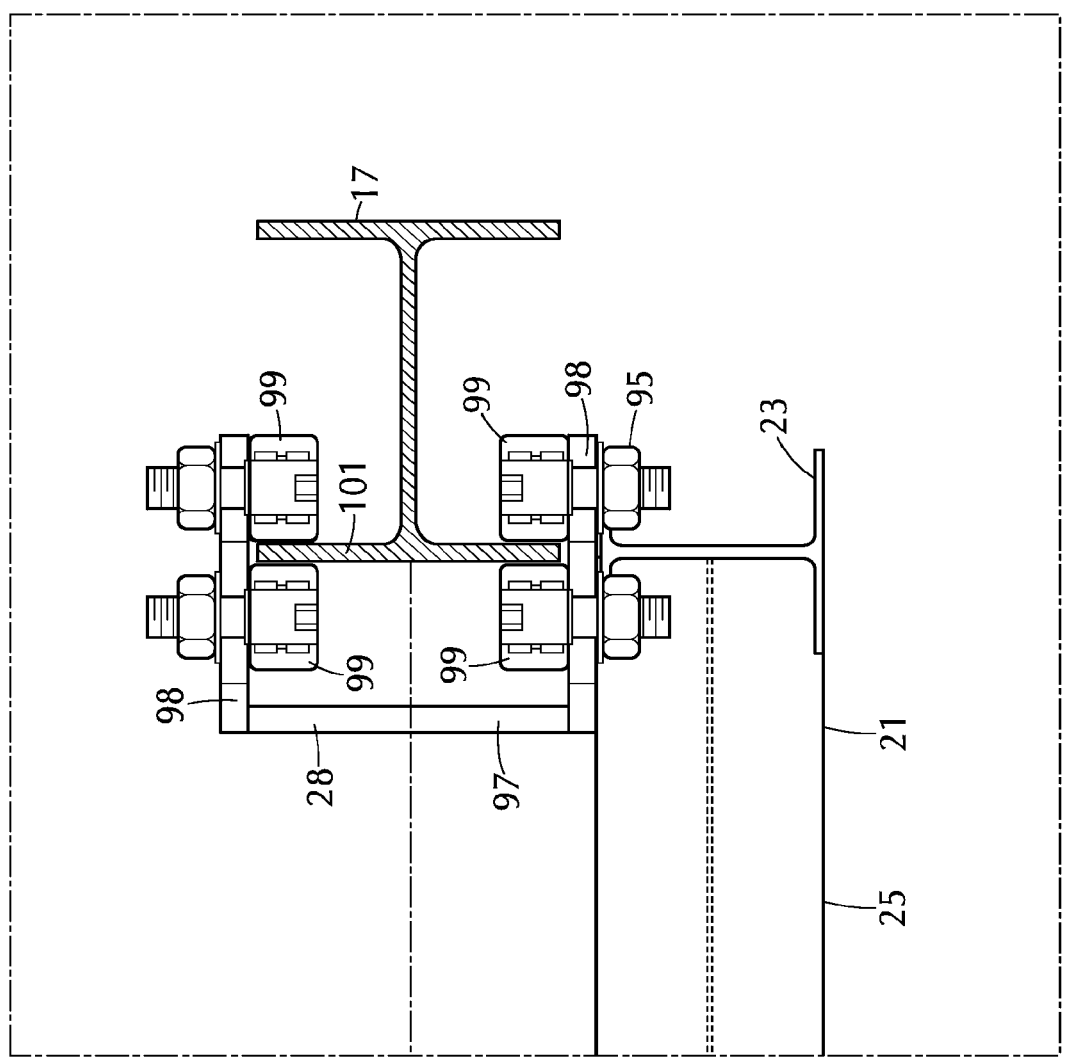
FIG. 10 is a detailed plan view of the side pillar and the bearing structure of the profiling structure that moves thereon.

Referring to FIG. 10, the bearing structure is shown in a plan view. Bearing system 28 is bolted to a rear flange 95 of the I-beam of the side member 23. The bearing structure 28 is identical to the bearing structure 29, which is also bolted to the side member 23, which is below it but not visible in FIG. 10. The bearing structure 28, 29 comprises a channel shaped member 97 having longitudinally spaced parallel walls 98 through which a plurality (six in the preferred embodiment) rollers 99 are bolted. These rollers 99 are arranged as three pairs and opposing members roll on opposing sides of vertical inward flange 101 of the I-beam pillar 17. There is very little play in this system and the only real movement which is possible for the bearings 28, 29 is upward and downward, which is facilitated by the low friction of the rolling mechanism of the various rollers 99 on the flat surface of the flange 101.

Figure 11:
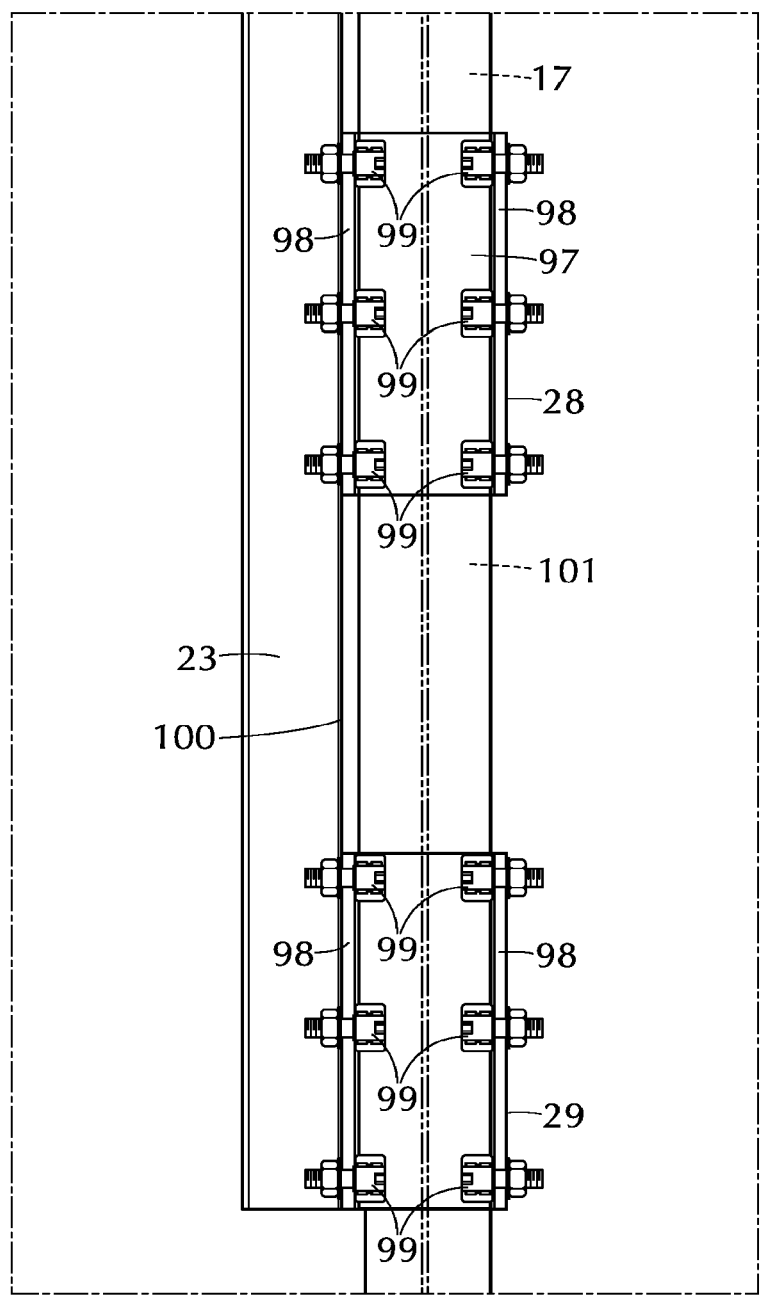
FIG. 11 is a partially cut-away detailed side view of the bearing structure of the profiling structure and the I-beam side pillar.

FIG. 11 further illustrates the bearing structure in a detailed side view, wherein the side pillar 17 is shown in phantom and the three pairs of rollers 99 found in each of the bearing structures 28 and 29 can be seen. The bolts that secure the rollers 99 on the forward side of the bearing structures 28 and 29 also bolt the bearing structure to the flange 100 of I-beam side member 23.

The profiling system disclosed may be used alone to shape the surface of the particulate material, e.g., the coal, in a railway car. The planar top and sloping planar sides of the trapezoidal contour is desirable simply from an aerodynamic standpoint and it reduces to a degree some of the particulate dust that can be blown away from the car. However, the profiling system can also be advantageously combined with a compacting system, preferably the compacting system shown in FIGS. 16 to 22 of WO/2010/077348 and described in the associated description in the specification thereof. The profiling enhances the compaction process.

Figure 12:
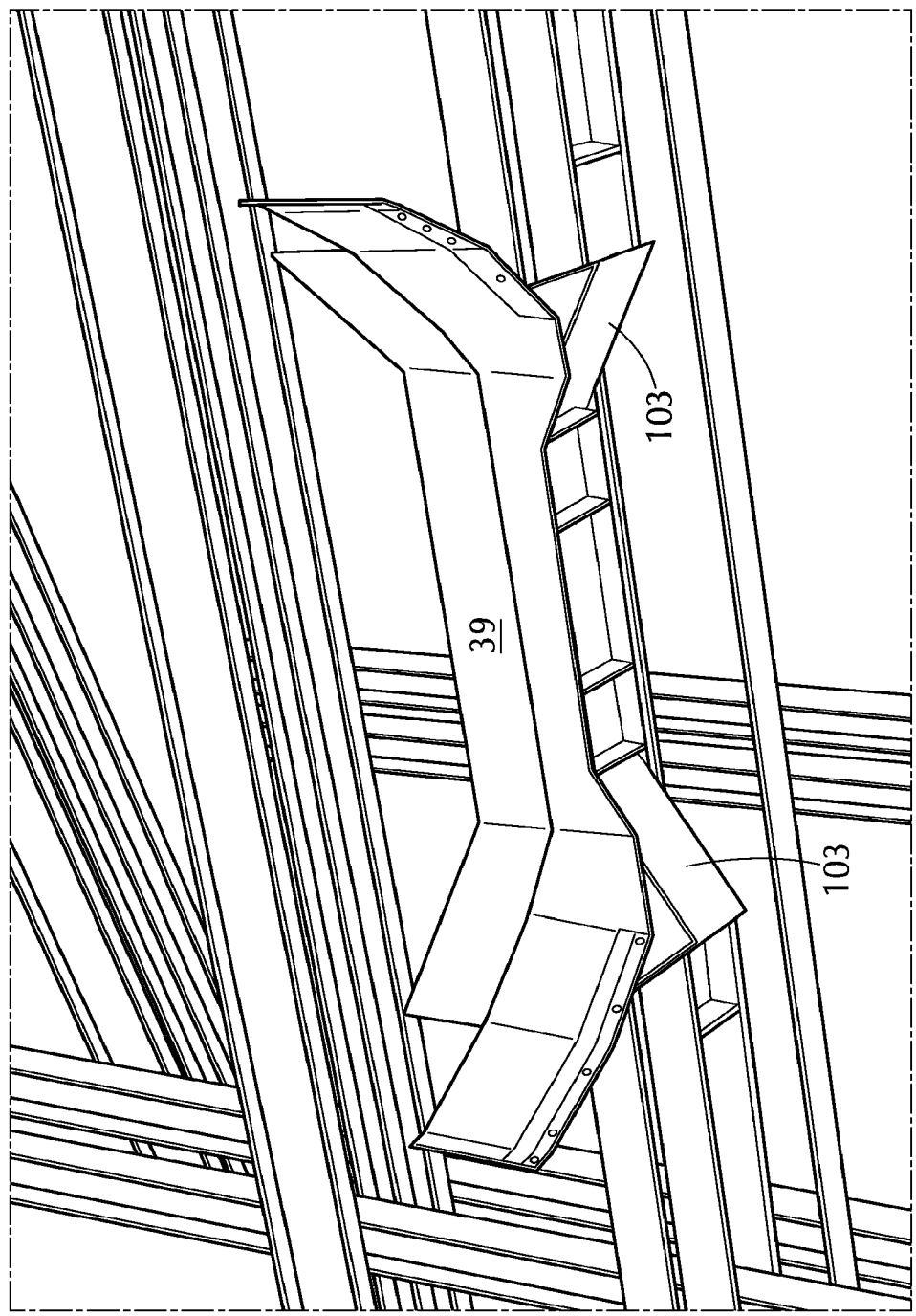
FIG. 12 is a photograph of an alternate embodiment of a plow structure.

FIG. 12 shows another embodiment of the plow structure of the invention. In this embodiment, the plow structure is welded directly to a rigid cross beam without the pivotal connection of the first embodiment. The front of the plow structure, the plow face 39, remains the same, but it is additionally bolstered by diagonally extending bottom plates 103 welded to the internal walls, which additionally rigidifies the structure. The cross beam is supported for reciprocating vertical movement on side pillars, controlled by a counterweight pulley structure similar to the system used for the first embodiment.

Figure 13:
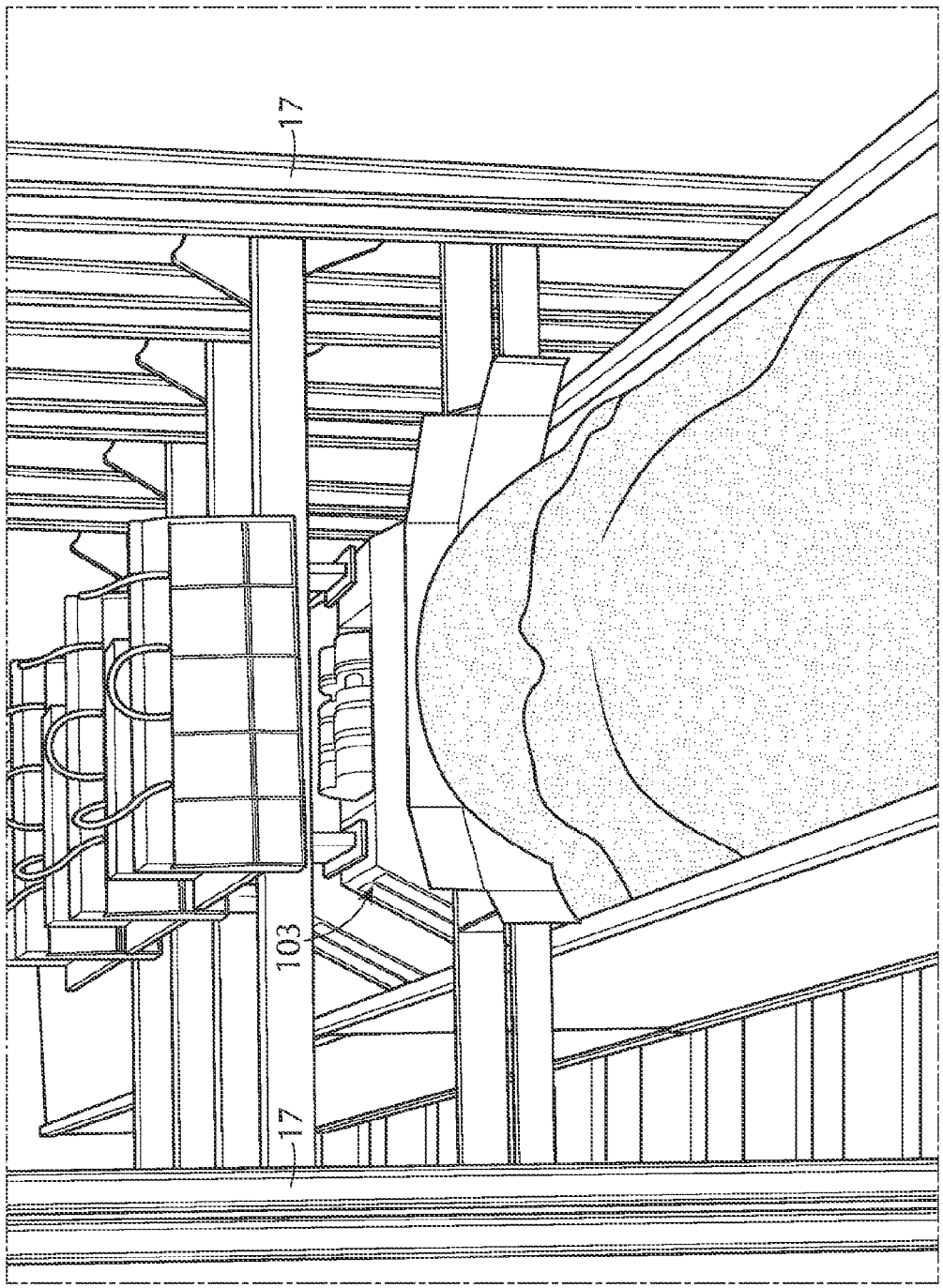
FIG. 13 is a photograph of an alternate embodiment of a plow structure being used in a system combined with a compaction operation.

Referring to FIG. 13, the embodiment of FIG. 12 is part of a system wherein the support structure in the form of a side pillar 17 are merged with the support structure for the multiple plate vibrating compaction system 103 similar to that shown in WO/2010/077348. The profiling plow structure shown, or the profiling plow structure of the previous embodiment, may be combined with the vibrating compacting system by placing it in front of the first of the compaction plates that contacts the material in the railcar. The structure that supports the vibrating plates may be integrated with, linked to, or completely separate from, the side pillars that support the sliding upward and downward movement of the profiling plow structure.

Figure 14:
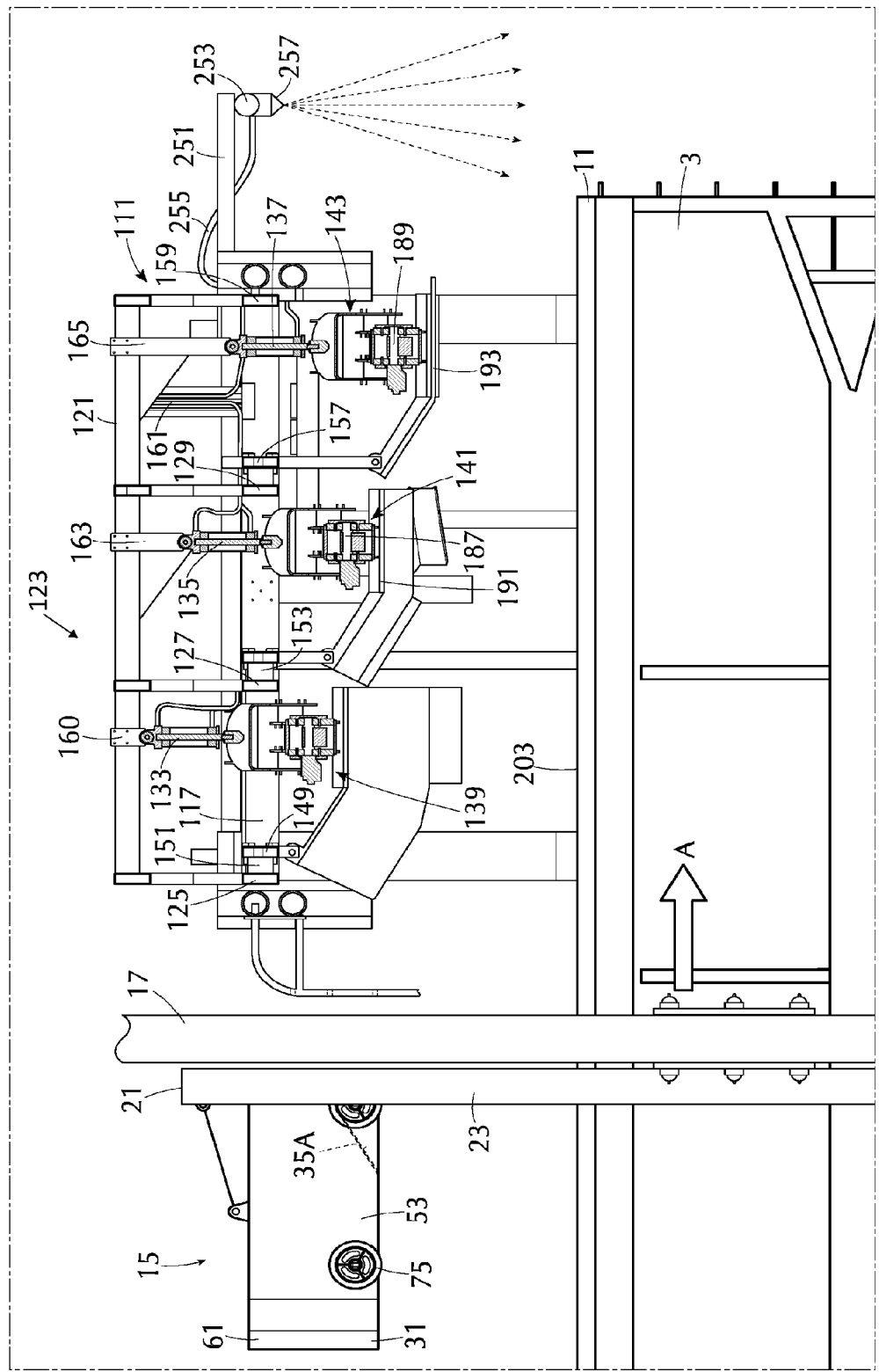
FIG. 14 is a side view showing a combination of the profiling structure with a compaction system.

Referring to FIG. 14, in a combined operation with a vibratory plate compaction system, support pillars 17 are located on either side of the railcar 3, which proceeds in direction A. The profiling structure 15 is the same as the first embodiment herein, and the same reference numbers are used. Behind the profiling station 15, the three compactor system generally indicated at 111 is supported on a structure as disclosed in WO/2010/077348, and it works in similarly, with similar operational parameters.

Referring to FIG. 14, a compaction system 111 is shown. This system operates with a computerized system preferably where the approaching railroad cars are scanned with an RPID reader and the data from this reader is transmitted to a computer system that controls the movement of the hydraulics in the compaction system 111.

The compaction system 111 is supported on a tower structure (shown in FIG. 13) on each side of the rails on which the open top gondola cars are moving after they are loaded with particulate lading, most commonly coal. The tower structure supports at its upper end a frame 117, which is a horizontally disposed frame supported for upward and downward movement by operation of two hydraulic cylinders 119. Frame 117 is additionally reinforced by arched support superstructure 121, which is secured above it fixedly so that support structure 121 and 117 form a unitary structure that can bear the loads created by the compaction and the interaction of the compaction system 111 with the railway cars that it operates on.

Hydraulic cylinders 119 are configured to elevate the structure 117 and 121, together with the three compactor or groomer stations, generally indicated at, depending from the structure 117 and 121, responsive to the computer control. The default position of the frame 117 in a situation where there is no pressure in the hydraulic fluid is raised with full clearance for a locomotive or a gondola car or any other railroad car to pass thereunder. Hydraulic fluid is supplied under computer control to the cylinders 119 as appropriate to cause the frame 117 to descend to an operating distance above the gondola car. The computer system times the elevation so that a gondola car 3 wall, or a locomotive (not shown) or other railway car may pass underneath the compacting stations freely in this raised condition. Once the front wall of the railway car is clear, the computer activates the hydraulics 119, which force the structure 117 and 121 and the groomer stations 123 downward so that the stations 123 can engage with and compact the coal in the gondola car 3 when appropriate. The computer similarly elevates the frame 117 and the stations 123 to clear the back wall of the gondola 5 as it passes under the tower 113.

Frame 117 is supported on hydraulic cylinders 119 for reciprocal vertical movement. The hydraulic cylinders 119 are controlled by the computer system to avoid contact between the groomer stations 123 and the coal except when grooming is appropriate. The frame itself is constructed of an outer rail 125 of roughly square construction and two lateral cross beams 127 and 129 which define therebetween three spaces in the frame 117 through each of which a respective one of the grooming stations extends.

Hydraulic lines 131 of stainless steel hydraulic tubing run to the cylinders 119 from a stationary hydraulic manifold 161. The hydraulic manifold 161 has a number of outlets that are independently operated by the computer system to allow or interrupt-hydraulic fluid flowing through the lines 131 to the respective cylinders 119 to selectively elevate or lower the overall frame 117. Other outlets of the manifold 161 are connected by lines of flexible material to the individual hydraulic cylinder structures 133, 135, and 137 of compaction stations 139, 141 and 143 to selectively elevate or lower them for compacting the coal. The manifold 161 is connected to and controlled by the computer system that controls operation of the grooming/compactor system, and can selectively control the vertical movement of frame 117, and each of the individual cylinders 133, 135 and 137 to move independently of each other as the computer system directs. When actuated by the computer, the manifold directs hydraulic fluid to the selected cylinder or cylinders, and they apply downward force to the frame or grooming station so as to move it downward to groom and compact the coal or particulate material in the gondola car.

The hydraulic cylinders are preferably off-the-shelf products manufactured by the company Lehigh Fluid Power, Inc., of Lambertville, N.J. The two hydraulic cylinders 119 for elevating the frame are preferably each a 6-inch bore, 60-inch stroke hydraulic cylinder. The hydraulic cylinders controlling the independent movement of each of the grooming stations 133, 135 and 137 are preferably each a hydraulic cylinder with a 6-inch bore and a 12-inch stroke.

Figure 15:
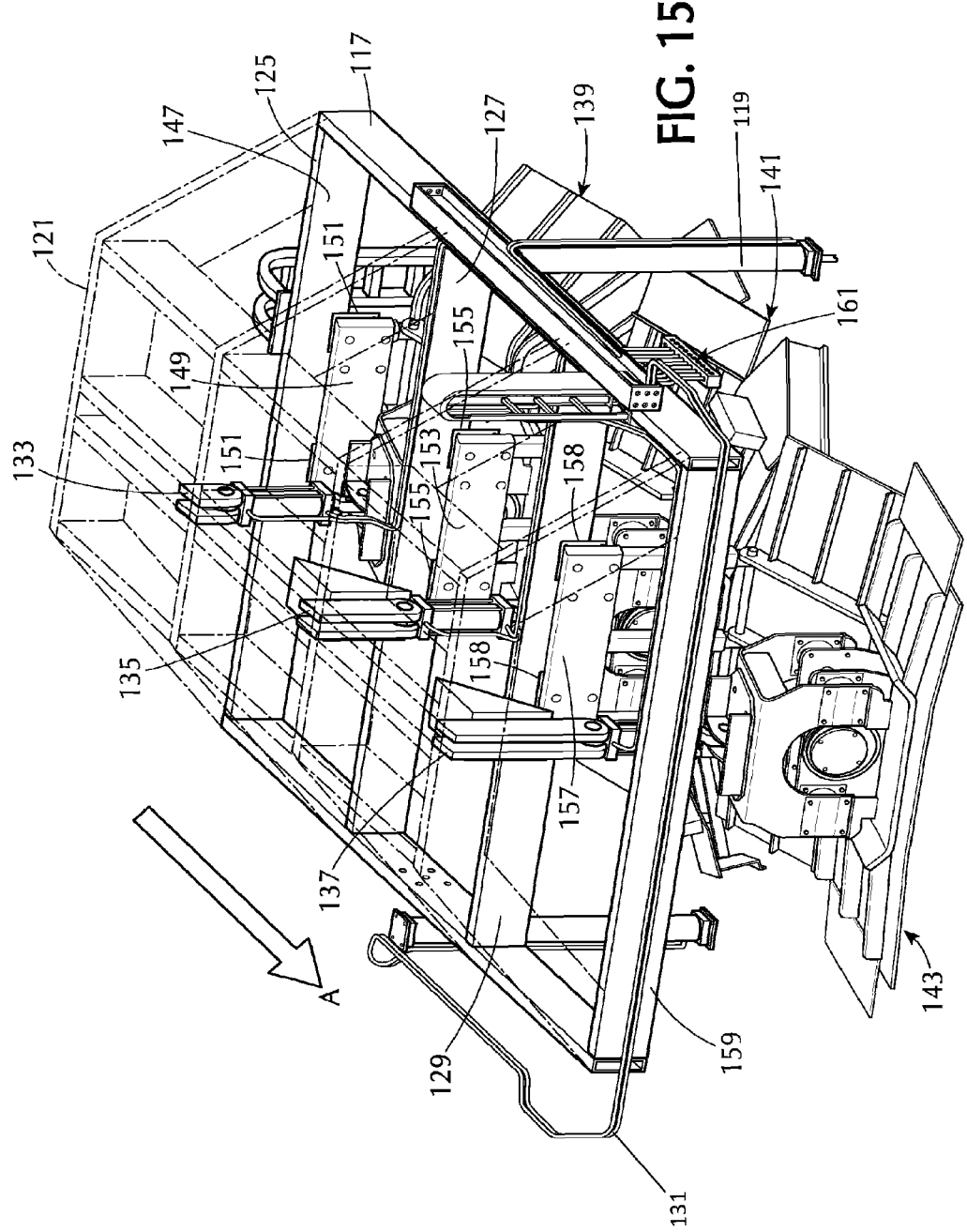
FIG. 15 is a perspective view of the compaction system of FIG. 14, showing also the three grooming stations with the exterior support superstructure shown in phantom.

Referring to FIG. 15, the support structure 121 (shown in phantom) is secured operatively to an upper end of each of the hydraulic cylinder structures 133, 135, and 137. These hydraulic cylinder structures each include a respective rigidly mounted beam that extends downward from the superstructure and pivotally connects with the respective hydraulic cylinder, each of which is pivotally connected at its lower end to a respective one of grooming station I generally indicated at 139, grooming station II generally indicated at 141, and grooming station III generally indicated at 143. Each of these grooming stations is associated with a respective hydraulic cylinder 133, 135 or 137 and is independently movable responsive to pressurization thereof.

The first grooming or compaction station 139 is supported longitudinally between the first crossbeam 127 and rear beam 147 of the frame 117. The grooming station 139 is supported and secured to the rear beam 147 by a vibration-isolating connection structure 149, which is similar to a vibration isolating engine mount. Connection structure 149 is secured to beam 147 with bolts extending through elastomeric cushioning pads or donuts generally indicated at 151. This pair of laterally-spaced elastomeric pads prevents transmission of vibrations from the grooming station 139 to the cross rail 147. Similarly, the second grooming station 141 is located between cross beams 127 and 129 of frame 117, and is secured by a vibration isolating mounting structure 153 secured to crossbeam 127, similarly to the vibration isolating system 149. The connection and support structure 153 includes bolts which secure the station to the crossbeam 127 through a pair of elastomeric pads or donuts 155 between the mounting structure 153 and the crossbeam 127 that prevent the passage of vibrations therebetween. Finally, the third station 143 is located longitudinally between crossbeam 129 and the rearmost crossbeam 159 of the frame 117. Third grooming station 143 is supported on a vibration isolating connection structure 157 secured to crossbeam 129, which also includes two elastomeric vibration isolating pads 158 as in the other two connection structures 151 and 155.

In operation, the profiling plow structure is lowered to roll on side rails 11 of car 3, and the compaction system 111 is lowered to a level for contacting the material in the car. The material encounters first the profiling plow structure 15, and it first profiles the particulate material 33 as described previously. The profiled material then is carried in the rail car 3 to the first of the vibrating plates, and the profiled pile of material is compacted sequentially by each of the three plates of the compaction system 111. The result is a profiled, compacted load of material in the car 3 that is less likely to lose material to passage of air over the car as it is moved.

FIG. 14 shows the pillars 17 fairly close to the compaction station. Alternatively, the plow structure may be more remote from the vibrating structure, if this is preferable. Also, the two systems may be controlled by the same electronic or computer-based system, or two independent computer systems may control respectively the profiling system and its elevation or lowering, and the compacting system and its operation.

Referring again to FIG. 14, the gondola cars 5, one of which is shown, are loaded with coal or other lading, and proceed through compaction system 111 in travel direction A. In the schematic of FIG. 14, the structure of the compaction system is shown in an elevated condition. The relative operating heights of the three different stations 139, 141, 143 are visible in this schematic. Station 1 (139) has the highest relative position, and it contacts the coal or particulate matter in the gondola first, in its least compacted state.

Station II is somewhat lower, and the hydraulic cylinder structure 135 that activates this station 141 includes a downwardly extending extension beam 163 affixed to the reinforcement frame 121, causing the extension stroke of the cylinder of structure 135 to press the grooming station II (141) to a lower distance. The vibration isolation connection 153 also includes extension beams extending downwardly from the level of frame 117, to provide Station II at a lower height.

Station III has an even longer extension support 165 that is fixedly secured to the reinforcement structure 121 and extends fixedly downward therefrom to provide a lower height from which hydraulic cylinder 137 presses Station III downward. Connection structure 157 also has extension beams projecting downwardly from the frame to provide the lower operating height of Station III.

Figure 16:
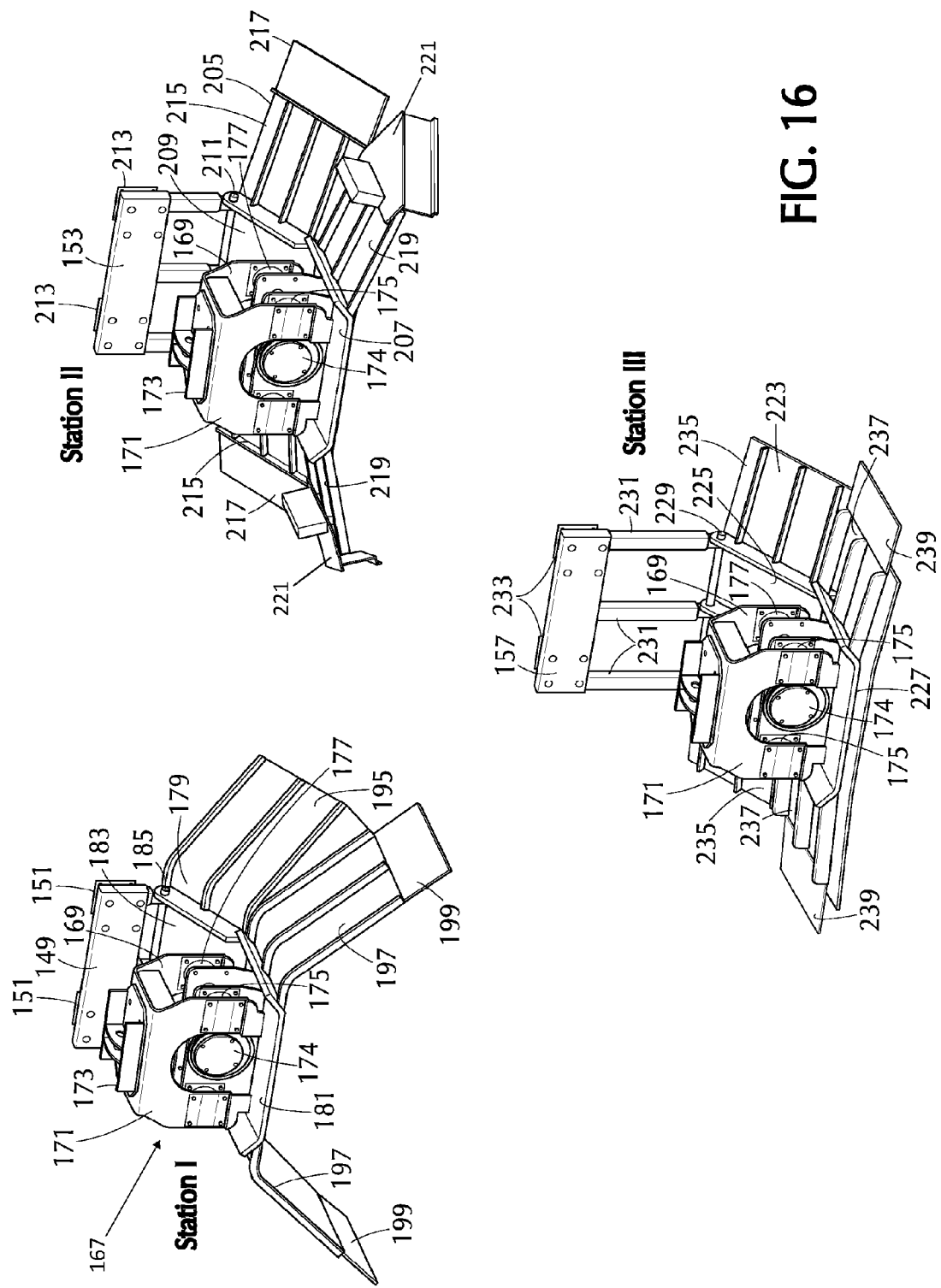
FIG. 16 contains a perspective view of each of the three stations of the compaction system of FIGS. 14 and 15.

Referring to FIGS. 14 and 16, Station I comprises hydraulic cylinder structure 133 secured on downward extending bracket support beam 160 on support structure 121. The upper end of the hydraulic cylinder 133 is pivotally secured to support beam 160 and the lower end is pivotally secured to a housing 167. Housing 167 includes two longitudinally spaced vertical walls 169 and 171 extending downwardly from rigidified upper securement structure 173, which comprises a horizontal wall extending between the walls 169 and 171 to form a box- or channel-shaped structure, with reinforcing gussets affixed inside strengthen the structure. In addition, structure 173 has a reinforcement structure affixed to its upper surface, with vertical flanges pivotally connected with cylinder 133.

A hydraulic vibrator 174 is supported between two flanges fixed to and projecting upwardly from compaction plate 181. These flanges are secured by a vibration-isolating connection to walls 169 and 171 through two pairs of pneumatic vibration isolators 175 and 177. The flanges link the hydraulic vibrator 174 to the contour surface structure 179 at their lower ends, affixed to the contouring surface structure 179. The vibrator 174 is driven by pressurized hydraulic fluid and imparts vibration to the compaction surfaces, as will be discussed further below.

Contouring surface compacting structure 179 includes a first plate portion 181, generally horizontal in FIG. 14, which is connected with an upwardly sloping plate portion 183, which extends forward and slopingly upward from the forward edge of plate 181. The forward end of plate 183 is secured by a pivotal connection 185 which allows rotation about a transverse horizontal axis of rotation of the apparatus. The pivotal connection 185 joins the compacting grooming surface structure 179 to the connection structure 149 that connects through pneumatic vibration isolators 151 to the forward beam 125 of frame 117. The pivot 185 allows surface compacting structure 179 to rotate about the axis of rotation as the hydraulic cylinder 133 extends or contracts, lowering or elevating the hydraulic vibrating compactor 174 and the associated compacting portions of Station 1.

Stations II and III are similarly configured for up and down movement, each having a respective hydraulic vibrating compactor 174 that is supported between front and back walls 169 and 171 by a pneumatic vibrating isolator system similar to that shown in FIG. 16. This general structure is visible in FIG. 14, where vibrating component 187 of Station II and vibrating component 189 of Station III are shown fixedly secured to their respective grooming surface structures 191 and 193.

As best shown in FIG. 14, Station I comprises grooming structure 179 which is pivotally secured about rotational connection 185 to the vibration isolating connection 149 with its two pneumatic vibration isolators 151, which prevent vibrations created by the pneumatic vibrator 174 from reaching into the overall compaction system 111. The grooming surface structure 179 comprises a first plate 181 joined with an upwardly sloping initial engagement plate 183 that is angled upwardly at approximately a 30 degree angle relative to horizontal and extends forward from the front edge of plate 181. Together, sloping plate 183 and horizontal plate 181 make up a laterally center part of the Station I, and this provides planar compacting at the top of the pile of particulate material or coal in the gondola car.

The grooming surface structure 179 also includes obliquely extending side plates 195 formed integrally with and extending obliquely downwardly and laterally from the lateral sides of plate 183, at an angle of about 45 degrees to the plate 183. The width of the structure from lateral extremities of plates 195 is slightly less than the interior width of the lading space in the gondola. Obliquely extending plates 197 are formed integrally with and extend obliquely downwardly from the lateral sides of horizontal plate 181, angulated at about 45 degrees to the plate 181. The lower ends of these plates 197 are near the width of the interior space of the gondola car, and each plate 197 each equipped with a hard rubber flap 199, which allows the grooming surface structure 179 to contact the upper chord of the side rails of the gondola car without a metal to metal contact which might be damaging to either the grooming structure or the railroad car, and also to partially enclose the coal pile in the car 3 to prevent pieces of coal from falling out of the car during compaction. Plates 195 and 197 are rigidified by ribs extending upward from their upper surfaces.

The forces imparted to the coal for compaction are similar to the forces applied to the coal in the first embodiment. The vibrator device 174 may be the eccentrically-loaded hydraulic motor described in regard to the roller embodiment. The vibrator compactor 174 provides a vibration that is preferably approximately 40 Hz, or 2400 vibrations per minute, although other vibration speeds may be used efficaciously.

The vibrator 174 is isolated by virtue of four pneumatic vibration isolators 175 and 177, which are in pairs, one pair in front between the vibrator and the wall 169 and the other pair between the vibrator 174 and the rear wall 171, so that vibration is transmitted substantially solely through front and back flanges fixed to and projecting upward from plate 181 of the grooming surfaces structure 179. To the extent that the vibration is transmitted into the pivot support 185, this vibration is also isolated in the pivoting grooming surface 179 by the pneumatic isolators 151 between the connector 149 and the frame 125.

The downward force applied to the top wall and support structure 173 by hydraulic cylinder 133 and the overall weight of the system is approximately 3,000 lbs. of continuous downward force, and, when combined with the vibration, results in a periodic vibrating force, with a maximum impulse force of about 24,000 lbs., i.e., a maximum total force 27,000 combined. These force levels may be adjusted as appropriate to the given application. The pressure on the coal from the compactor stations is in the range of 2 to 50 pounds per square inch (psi), and preferably in range of 7 to 19 pounds per square inch, and most preferably about 8 psi. Maximum psi should not exceed 50 psi. Similar vibration and force and pressure are applied to the coal at each of the Stations I, II and III.

Station I starts the compacting process of the crown of the material in the gondola car. As the gondola car 3 rolls forward, the first contact is with the loaded particulate at plate 183, which engages the coal with a downward facing engagement surface on its lower side, and that of the side wings 195, and starts to wedgingly press it down, sliding over the coal, until it reaches the contiguous surface under plate 181, and under its side wings 197, where it is compacted to a final height, and first Station I passes rearward of the car 3 to the coal further back. This initial compacting is applied immediately as the gondola car's front wall 201 passes underneath the first grooming Station I. The vibration and downward force compress the particulate material to the level of the trailing edge of plate 181, which is approximately 10 inches above the top side chord 203 of the railroad car 3. The sloping lateral plates 195 and 197 also create a groomed compacted crown on the coal, and the rubber flaps 199 prevent the coal or particulate matter from falling out of the railroad car. Plate 181 preferably is close to horizontal during this compaction, but may also be at an angle due to pivot 185 and the height of the coal.

Referring again to FIG. 16, Station II comprises a vibrator 174 in a housing that is essentially the same structure as the vibrator housing of Station I. The housing comprises a top wall and reinforcement structure 173 that is engaged pivotally with hydraulic cylinder 135 at its lower end, and forms a generally channel-shaped gusseted structure with a forward wall 169 and a rearward wall 171 that support the vibrator 174 therebetween between vertical flanges projecting upward from the top of the compacting surface structure, which are bolted in vibration isolation connection to walls 169 and 171 through another two pairs of pneumatic vibration isolators 177 and 175, thus isolating the vibrator 174 and the vibrating compaction surfaces from the hydraulics and the outside housing.

The vibrator 174 of Station II is fixedly secured to the grooming surface structure 205, which has a downward facing angulated set of surfaces to engage and compact the coal as it slides over it. Structure 207 includes a planar middle plate 207 and a diagonally extending upwardly angled surface plate 209, which extends up integrally from the front edge of plate 207 to the pivotal connection 211 that secures the grooming surface structure to extension beams connected to the vibration isolation connection 153. The connection structure 153 is secured to crossbeam 127 of frame 117 via a pair of pneumatic vibration isolators 213, so that vibration of the grooming surface structure 205 is not transmitted to the frame 117.

Grooming surface structure 205 also includes two downwardly angulated and laterally extending grooming surface side plates 215 which each end in a respective rubber flap 217 to allow for a close contact with the upper chord 203 of the gondola car 3 to prevent the loss of particulate matter as the compacting proceeds, and also to allow contact between the rubber flaps 217 and the top chord without damage. In addition, Station II has two downwardly obliquely extending plates 219 each projecting downwardly and outwardly from a lateral outward edge from the horizontal plate 207. Plates 219 have secured to their outward lower extremities or ends trenchers. These trenchers 221 scrape together the particulate material underneath these surfaces 219, so as to move it slightly laterally inboard and to create a space on either side of the crown of the coal material that allows for one or two inches or more of space on either side between the top of the coal pile after passage through station 2 and the inside of the side wall of railway car 3. Generally, the metallic surfaces of all stations are narrower than lateral width of the inside of the gondola car, while the rubber flaps are configured to at least partially overly the top chords of the side walls of the gondola.

The diagonal upward slope of the coal engaging surface of the underside of plate 209 of Station II is approximately 30 degrees, and it slides over the compacted coal crown produced by station I, compacting it to pass under the contiguous undersurface of plate 207, which is preferably near horizontal during operation. A similar sliding compaction occurs with side wings 215 and 219. The coal is reduced to a second compaction height defined by the trailing edge of the undersurface of plate 207. The forces and the vibration applied at Station II are the same as for Station I. The compression of the material after Station II passes over the coal is preferably down to approximately five inches above the top rail of the gondola car 3.

The downward angle of the side plates 195 and 197 of Station I relative to center plate 181 is approximately 45 degrees due to the likely high humping of the coal or particulate matter in the gondola car after it is loaded, but before any compacting. In contrast, in Station II, the downward angle of the lateral wing plates 215 and 219 may be as little as ten degrees relative to the associated plates 209 and 207 due to the increased compaction of the coal at this stage and the reduction of the height of the crown of the material in the gondola car 3.

Station III is the final compacting and grooming station of the compaction system. The grooming system of Station III includes an identical vibrator structure 174 supported in a substantially identical housing i.e. front and rear walls 169 and 171 and two pairs of vibration isolators 175 and 177 suspending a pair of flanges affixed to the compaction plates with the vibrator 174 therebetween. The grooming surfaces 223 of station 3 are comprised generally of a first sloping plate 225 and a generally horizontal plate 227 located directly below the vibrator 174 and fixed thereto. The structure is pivotable about pivotal connection 229 which connects to the lower end of support beams 231 which extend downwardly from vibration isolating connection structure 157 which has a pair of pneumatic vibration isolator pads 233 secured to crossbeam 129 at frame 117 and isolating therefrom the vibrations of vibrator 174.

In addition, Station III includes two generally horizontal and slightly downwardly extending plates 235 on either lateral side of oblique plate 225 and a final finishing surface formed by slightly downwardly extending plates 237 on either side of generally horizontal plate 227. These plates 237 each end in a respective rubber flap 239 that rides along the top chord of the railway car 3. At this stage of compaction, the forces and vibrations speeds being the same as the first and second stations, the coal is now compressed down to a height which is nearly flush with the top chord of the railway car 3, with at most a slight hump in the middle of the car, reflected in the slight angulation of the lateral plates 237. The forces and the vibration applied at Station III are the same as for Station I and Station II. The rubber flaps 239 partially enclose the car and prevent loose coal that did not become the compressed coal from falling out during this final grooming process, which leaves a slightly humped but tightly compressed load of particulate matter in the gondola car.

The rubber flaps are made of hard rubber or other elastic material that can contact the chords of the top of the railway car 3 without damage. The remainder of the structures, i.e., all the plates of the surfaces of grooming surfaces 179 of grooming station 1 or 205 of station 2 and 223 of station 3 are formed of preferably stainless steel, and are reinforced with ribbed flanges projecting upwardly therefrom to provide rigidity to allow the compaction of the coal under them, with the attendant forces.

The system results in the guards and grooming tools which prevent coal from escaping the car or from being left on the top chords of the gondola car, or for intruding into the mechanical parts of the equipment, i.e. into the movable surfaces of the compaction system.

The operation of this compaction system is preferably fully automated and computer controlled, and the movement of the frame 117 up and down with the associated grooming stations is totally controlled by the computer with the necessary information that is derived from the RFID scanner, as well as laser scanners that actually detect the approach and dimensions of the car apart from the tag data. This system allows for independent use of the three stations so that the process can function as efficiently as possible.

In operation, based on the dimensions of the car determined from, e.g., the RFID tag data, the profiling structure, the frame and grooming Stations I, II and III are elevated to a reasonable height to clear the front wall as the gondola approaches. The front wall of the gondola passes the profiling station, and the profiling structure and plow structure are lowered so as to contact and profile the coal. The front wall of the gondola then passes Station I, and Station I is then lowered by its hydraulic to contact the already profiled coal toward the front of the car. As the front wall passes Station II, Station II is lowered to contact the coal that has been compacted already by Station I. As the wall passes Station III, Station III hydraulics lower Station III to finish the compaction of the coal already compressed and groomed by Stations I and II. Stations I, II and III are then elevated, preferably each individually, as the rear wall of the gondola reaches them. The process is then repeated for the next railcar. Alternatively, the frame 117 may be elevated to clear all Stations I, II and III over the rear wall instead of or in addition to the elevation by their individual hydraulics.

Use of the profiling system is also possible with fewer than all three compacting units. It has been found that the system operates effectively where the middle compacting unit 141 is removed.

In addition, referring to FIG. 14, after the profiling and compacting, it has been found advantageous to spray some sort of binding agent to further contain dust that may be on the outer surface of the coal or other particulate material in the gondola car. To that end, an armature 251 or similar support structure is fixedly attached to the frame 121 and extends forward from the front end thereof in front of the compactor systems. The armature 251 supports a transversely extending tubular conduit 253 that is supplied with the liquid binding agent via a line 255, and the binding agent is sprayed from a number, preferably eight, of laterally-spaced downwardly-directed nozzles 257. These nozzles are well known in the art, and are V-jet type nozzles that project the binding liquid generally uniformly in a conical spray pattern onto the upper surface of the compacted particulate material.

Many types of binding fluids may be used, preferably aqueous in nature. Possible liquids that may be employed include various complex sugar solutions, guar gum or other gums, tree sap, latex, and virtually any other liquid that is water based and sticky enough to promote or aid agglomeration of smaller dust or other particles in the gondola car.

The hydraulics and the location of the grooming stations accommodate coal of varying heights and function at current loading speeds, which means that it is also possible to run the cars continuously without stopping and provide a contoured, compacted upper surface to the coal which will reduce the loss of coal due to the movement of the car or passage of air.

The embodiment described can use laser systems to detect the approach and possibly dimensions of the gondola cars as they come to the compacting station. In the environment of a coal loading system, there is a great likelihood of dust in the air, with a resulting limit on visibility that may affect operation of a laser or light-based scanning and detection system. Accordingly, ultrasound detectors may be used in place of the laser systems.

The vibration of the plates in the above embodiment is accomplished using hydraulic vibration systems. Electrical vibration systems may be employed in place of the hydraulics systems described above. Electrically powered vibrators then take the place of the hydraulic vibrators, and cables carrying electrical power replace the conduits that carry the hydraulic fluid to the hydraulic vibrators. Also, a roller or combination of rollers may be used for compaction instead of a plate structure.

The computer systems that control the operation of the compacting system were above described as PC-based. Instead of a PC computer, the compactor control system also may include or be based on a PLC (Programmable Logic Controller) that controls movement of the pallet and the hydraulic cylinders that move the various profiling structures or plates of the embodiment so as to clear the locomotive or the walls of the gondola cars, and to drop down into the interior spaces of the gondola cars so as to compress the coal or particulate material. The PLC is an electrical hardware system configured for automated process control, and it usually contains a microprocessor and some accessible memory storing software loaded into it that causes it to appropriately manage the process, as well as a number of input or communications ports for coordinating the process based on relevant inputs, such as the signal produced on detection of the space between railcars by the scanner. The PLC is similar to a PC, but its internal programming is specialized for motion control systems. The PLC has embedded software that makes it easier to control motion in a system without the underlying code that a PC system requires. The PLC system, or a combined PLC/PC control system, has the capability both for data processing/billing and also motion control of the compactor system, preferably in that the compaction process and the elevation of the compacting apparatus to clear the railway cars and locomotive, etc., is controlled by the PLC, while a connected PC system is provided with process data, e.g., how many gondola cars have been compacted, for system management, billing where there is a per-car charge, and any other maintenance or higher level operations.

The terms used herein should be viewed as terms of description rather than of limitation, as those who have skill in the art, with the specification before them, will be able to make modifications and variations thereto without departing from the spirit of the invention.

What is claimed is:

1. A system for profiling particulate material in an open top conveyance, said system comprising:
    a profiling structure supported above the open top conveyance;
    said profiling structure engaging the particulate matter in said open top conveyance as the open top conveyance moves in a forward direction therebelow so that the particulate matter forward of the profiling structure is given a generally uniform profile in at least a longitudinal middle portion of the open top conveyance;
    wherein the profiling structure includes a plow structure supported on a movable support structure that is supported on a pair of pillars each fixedly positioned on a respective side of the open top conveyance as said conveyance moves below the profiling structure, and
    said plow structure and said movable support structure moving vertically upward and downward on said pillars so as to be selectively elevated so as to allow clearance for passage of the conveyance thereunder and lowered so as to engage with the particulate material.

2. A system according to claim 1, wherein the open top conveyance is one of a sequential train of gondola cars moving on a pair of rails extending under the profiling structure.

3. A system according to claim 1, wherein the particulate material comprises coal.

4. A system according to claim 1, wherein the plow structure is moved upward and downward by a computerized control system that detects the open top conveyance as it moves toward the plow structure and responsive to said detection elevates the plow structure so as to clear a front wall of the open top conveyance, and then lowers the plow structure after the front wall of the open top conveyance has moved forward of the plow structure so that the plow structure engages the particulate material in the open top conveyance, and then again elevates the plow structure so as to clear a rear wall of the open top conveyance as said rear wall approaches the plow structure.

5. A system according to claim 1, wherein the profiling structure is supported on a structure that is biased to elevate the profiling structure above a predetermined height, and the profiling structure must be forced downward against an upward bias force thereon in order for the profiling structure to engage the particulate material.

6. A system according to claim 1, wherein the plow structure comprises a generally rearward facing wall having a center portion perpendicular to the direction of movement of the open top conveyance, and lateral end portions above respective lateral sides of the open top conveyance extending generally longitudinally relative thereto.

7. The system according to claim 6, wherein the wall has a lower edge portion defining a downward facing profile recess in said wall which defines the profile imparted to the particulate material in the conveyance.

8. The system according to claim 6, wherein the wall has a plurality of vertically extending wall portions each angulated with respect to each other such that the wall has a rearwardly concave generally arcuate shape, wherein the lateral outermost wall portions extend substantially longitudinally relative to the conveyance.

9. A system according to claim 1, wherein the profiling structure engages lateral side rails of the open top conveyance and the profiling structure has wheels rotatably supported thereon that roll on the lateral side rails.

10. A system according to claim 1, wherein the plow structure includes-a box support structure attached to and integrated with the rearwardly disposed wall, said box structure including a plurality of laterally spaced longitudinally extending reinforcement walls fixedly secured to the wall and to a second wall spaced forwardly from the first wall.

11. A system according to claim 1, wherein the plow structure includes-a skirt of elastic material that engages the open top conveyance and aids in preventing particulate material from falling from the conveyance while being profiled.

12. A system according to claim 1, wherein a vibrating compacting member is supported forward of the plow structure, said vibrating compacting member engaging an upper surface of the particulate material after said material is profiled, and applying thereto a downward force coupled with vibrations.

13. The system according to claim 12, wherein the vibrating compacting member has a middle planar portion sloping generally upward and rearward, and two lateral side portions attached fixedly thereto and extending laterally and obliquely downward and outward therefrom.

14. A method of profiling particulate material in a train comprising a series of open top railroad cars, said method comprising:
   a) providing a profiling structure supported for reciprocal movement in a vertical direction above a pair of rails;
   b) moving the train along on the pair of rails so that the cars pass under said profiling structure;
   c) elevating the profiling structure to a height adequate to provide clearance for a forward end wall of one of the cars to pass thereunder;
   d) lowering the profiling structure so as to engage the particulate material in the car rearward of the forward end wall,
   e) profiling the particulate material in the car;
   f) elevating the profiling structure to a height sufficient to provide clearance for a rear end wall of the car;
   g) providing a compaction system supported above the rails and forward of the profiling structure; and
   h) after step (e), compacting the particulate material in the car with vibration and downward force applied thereto.

15. The method according to claim 14, wherein the lowering of the profile structure is to a height wherein the profile structure engages top lateral side rails of the car, and the profile structure has wheels rollingly engaging the side rails of the car.

16. The method according to claim 14, wherein the profiling structure includes
   a plow structure comprising a rearwardly concave plow wall with a plurality of vertical wall facets angulated with respect to each other and a reinforcement structure affixed to a rearward surface of said plow wall,
   the plow wall having a downwardly disposed recess therein that defines a profile shape imparted to the particulate material, said profile shape having a horizontal center surface and lateral obliquely downwardly extending side surfaces, and
   a cross beam supporting the plow structure, the cross beam being movingly supported on and extending laterally rearward of a pair of pillars each positioned laterally outward of a respective side of the rails.

17. The method according to claim 14, and further comprising sensing for approach of a railcar toward the profiling structure, wherein the process is computer controlled, and step (c) is taken responsive to the sensing of the approach of the car.

18. The method according to claim 14, wherein steps (c) through (f) are repeated with a subsequent open top rail car being moved in the train with and behind said car.

19. The method according to claim 14, wherein, after profiling and compacting, a liquid that aids in agglomeration of particles of the particulate material is sprayed onto the particulate material.

20. The method according to claim 15, wherein the particulate material is coal.

21. A system for profiling particulate material in an open top conveyance, said system comprising:
   a profiling structure supported above the open top conveyance;
   said profiling structure moveable such that the profiling structure engages the particulate matter in said open top conveyance as the open top conveyance moves in a forward direction therebelow so that the particulate matter is given a profile;
   wherein the profiling structure includes a plow structure including a skirt of elastic material that engages the open top conveyance and aids in preventing particulate material from falling from the conveyance while being profiled.

22. A system for profiling particulate material in an open top conveyance, said system comprising:
   a plow structure supported above the open top conveyance;
   the plow structure engaging the particulate matter in said open top conveyance as the open top conveyance moves in a forward direction therebelow so that the particulate matter is given a profile;
   wherein a vibrating compacting member is supported forward of the plow structure, said vibrating compacting member engaging an upper surface of the particulate material after said material is profiled, and applying thereto a downward force coupled with vibrations.

\* \* \* \* \*